United States Patent
Morizet et al.

(10) Patent No.: US 7,280,896 B2
(45) Date of Patent: Oct. 9, 2007

(54) PROCESS AND DEVICE FOR CONSTRUCTING A SYNTHETIC IMAGE OF THE ENVIRONMENT OF AN AIRCRAFT AND PRESENTING IT ON A SCREEN OF SAID AIRCRAFT

(75) Inventors: Benoit Morizet, Toulouse (FR); Pierre Lecomte, Aureville (FR); Jean-Claude Wanner, Laussou (FR); Nicole Wanner, Laussou (FR); Sébastien Lhote, Toulouse (FR); Patrick Morere, Toulouse (FR); Vincent Amade, Cestas (FR)

(73) Assignee: Airbus France, Toulouse (FR)

( * ) Notice: Subject to any disclaimer, the term of this patent is extended or adjusted under 35 U.S.C. 154(b) by 635 days.

(21) Appl. No.: 10/788,270

(22) Filed: Mar. 1, 2004

(65) Prior Publication Data

US 2004/0225420 A1 Nov. 11, 2004

(30) Foreign Application Priority Data

Mar. 7, 2003 (FR) .................................. 03 02861

(51) Int. Cl.
*B64C 23/00* (2006.01)
*G01C 1/00* (2006.01)

(52) U.S. Cl. .................. 701/3; 701/120; 701/207; 340/945; 244/158.1

(58) Field of Classification Search .................... 701/3, 701/4, 11–17, 23, 33, 36, 200, 207, 211, 120; 244/75 R, 158.1, 75.1; 340/945
See application file for complete search history.

(56) References Cited

U.S. PATENT DOCUMENTS 3,886,306 A * 5/1975 Fayard et al. ............... 348/117
5,781,146 A 7/1998 Frederick

FOREIGN PATENT DOCUMENTS

EP 1087210 3/2001

OTHER PUBLICATIONS

Preliminary Search Report dated Jan. 16, 2004 with English translation.

* cited by examiner

*Primary Examiner*—Gertrude A. Jeanglaude
(74) *Attorney, Agent, or Firm*—Stevens, Davis, Miller & Mosher, LLP

(57) ABSTRACT

A device for constructing a synthetic image of an aircraft environment may include information sources having information relating to the aircraft and to its environment. An information processor constructs a synthetic image of the environment of the aircraft on the basis of information emanating from the information sources. A display presents, on at least one part of a display screen, a synthetic image, which is constructed with the aid of a conical projection onto a plane of projection that is orthogonal to a line of aim that forms angles of lateral separation and angles of vertical separation with the course of the aircraft.

26 Claims, 6 Drawing Sheets

PROCESS AND DEVICE FOR CONSTRUCTING A SYNTHETIC IMAGE OF THE ENVIRONMENT OF AN AIRCRAFT AND PRESENTING IT ON A SCREEN OF SAID AIRCRAFT

FIELD OF INVENTION

The present invention relates to a process and a device for displaying synthetic images on an aircraft, in particular a civil transport airplane. More precisely, said process and said device are intended for constructing a synthetic image of the environment of the aircraft and for presenting it to at least one pilot of said aircraft.

BACKGROUND OF THE RELATED ART

It is known that the navigation and operation of aircraft, in particular of civil transport airplanes, may give rise to considerable work loads for the crews and the air traffic control. In particular, certain flight phases or conditions may be apt to engender greater or lesser dispersion of the attention of pilots. The complex synthesis of piloting and navigation data and of the states of the aircraft's systems may then not take place in an optimal and complete manner. The construction of false mental images of the actual situation of the aircraft in space, in particular as regards the vertical margins with respect to the terrain, may be the cause of untimely or erroneous judgements and behaviors.

Furthermore, during the use of flight management computers (for example "FMS" type: "Flight Management System"), difficulties may appear in the programming and analysis of the flight plan confirmed by the crew. Awareness of the trajectory piloted by the automatic facilities in relation to the outside environment is not immediate. The programming gives rise itself to a sizeable workload. It may also be erroneous, with awareness of the error coming later.

The two points mentioned above, namely, on the one hand, the lack of awareness of the vertical margins of the aircraft and, on the other hand, the difficulties in dialogue and in programming the flight management computers, may sometimes be the cause of accidents of the aircraft by contact with the terrain. These two points may be characterized by an overall lack of situational awareness. Situational awareness is a synthesis of mental models constantly updated by cognitive and physical activities. The performance of the automatic facilities may aid the crew during a situation of risk, but rarely increases the situational awareness of the pilots. Moreover, improvement of the situational awareness generally demands a considerable mental effort. The civil aviation sector is therefore seeking simple and intuitive means for aiding pilots to instantaneously ascertain the position of the aircraft in its environment, at the present instant and in the minutes to come.

SUMMARY OF THE INVENTION

A subject of the present invention is a process making it possible to construct a synthetic image which, when it, is presented to a pilot of an aircraft, makes it possible to aid the latter to improve the awareness that he has of the situation of the aircraft.

For this purpose, said process is noteworthy, according to the invention, in that:

a) a first straight line passing through the location of the aircraft and forming a first angle of lateral separation $\alpha$ and a first angle of vertical separation $\beta$ with the course of the aircraft is determined;

b) a first point is determined, said point being situated on said first straight line to the rear of the aircraft at a distance such that the vertical projection of this first point onto the horizontal plane passing through the location of the aircraft, is situated at a predetermined distance L1 from said location of the aircraft;

a line of aim passing through said first point and forming a second angle of lateral separation va and a second angle of vertical separation vb with a second straight line passing through said first point and parallel to said course of the aircraft is determined;

d) a plane of projection which is orthogonal to said line of aim is defined;

e) an image is constructed of at least a part of the environment at least in front of the aircraft, with the aid of a conical projection onto said plane of projection while taking account of said first point as reference point of the projection;

f) said image is delimited laterally by two vertical straight lines respectively cutting the horizon line of the image at second and third points which are such that, on the one hand, the angle between the line of aim and a third straight line passing through said first and second points corresponds to a predetermined angle and, on the other hand, the angle between the line of aim and a fourth straight line passing through said first and third points corresponds to a predetermined angle;

g) the scale of the image thus delimited is adapted so as to match the straight line segment which is formed by said second and third points and which defines the width of the image, to the width of a display screen on which one wishes to present said image, and this image is delimited vertically as a function of the height of said display screen; and h) the image thus constructed representing a synthetic image is presented on said display screen.

Thus, by virtue of the invention, said process makes it possible to construct a synthetic image in three dimensions for displaying the position (or the location) of the aircraft, as well as the environment in which this aircraft is deploying. This synthetic image is constructed according to a viewpoint outside the aircraft. The display (or the presentation) of this image on the display screen, which is for example situated in the piloting station of the aircraft, makes it possible to improve the awareness that the pilot has of the actual situation of the aircraft.

Advantageously:

said first angle of lateral separation $\alpha$ lies between 6° and 15°; and/or said first angle of vertical separation $\beta$ lies between 3° and 10°; and/or said predetermined distance L1 lies between 3 and 20 kilometers; and/or said second angle of lateral separation va is less than or equal to said first angle of lateral separation $\alpha$; and/or said second angle of vertical separation vb is less than or equal to said first angle of vertical separation $\beta$.

Furthermore, in a particular embodiment, said display screen is furnished with a heading scale and said angles between the line of aim and said third and fourth straight lines are such that the angular discrepancy on the heading scale between said second and third points lies between 40° and 140°.

Additionally, advantageously, in step g), the image is delimited vertically in such a way that the horizon line of said image is situated in the upper third of said display screen.

Furthermore, advantageously, in step e), only an image of the environment which is situated up to a predetermined distance in front of the aircraft is constructed.

In a preferred embodiment of the invention, the image constructed in step e) comprises at least the following elements:
- a first symbol representing the aircraft and indicating its location;
- a representation illustrating the terrain;
- a vertical reference stroke between said symbol of the aircraft and its vertical projection on said terrain; and
- a first plot representing the future trajectory of the aircraft.

Thus, the image constructed makes it possible to improve the pilot's awareness of the overall situation of the aircraft, in particular as regards the outside environment, and its future trajectory with respect to this outside environment.

Furthermore, advantageously, the image constructed in step e) moreover comprises:
- a second plot representing the vertical projection onto said terrain of the future trajectory of the aircraft; and/or
- a plurality of vertical strokes between points situated on said first plot representing the future trajectory of the aircraft and the corresponding vertical projections. Preferably, at least one of said vertical strokes comprises a safety altitude indication; and/or
- a heading scale represented above the horizon line; and/or
- a flight plan; and/or
- supplementary information, for example information about the air traffic or the weather.

Additionally, advantageously, said vertical reference stroke comprises a scale and/or an indication of safety altitude.

Furthermore, advantageously, said first symbol representing the aircraft is representative of the attitudes of the aircraft in roll, pitch and yaw.

Additionally, advantageously, said representation illustrating the terrain is colored as a function of the discrepancy between the altitude of the aircraft and the altitude of said terrain.

Furthermore, advantageously, any risk of collision of the aircraft with the terrain is detected by calculating the distance between the future trajectory of the aircraft and said terrain, and a first alarm indication is presented on said image when such a risk of collision is detected.

Moreover, advantageously, any risk of intersection of a flight plan of the aircraft with the terrain is detected by calculating the distance between a trajectory corresponding to this flight plan of the aircraft and said terrain, and a second alarm indication is presented on said image when such a risk of intersection is detected.

In a particular embodiment, a rotation of the line of aim by a predetermined angle about the aircraft is carried out. This makes it possible to be aware of the situation of the aircraft with respect to the terrain situated behind it or to the sides, as specified hereinbelow.

The present invention also relates to a device for constructing a synthetic image of the environment of an aircraft and presenting it to at least one pilot of said aircraft.

According to the invention, said device of the type comprising:
- information sources comprising information relating to the aircraft and to its environment;
- information processing means able to construct a synthetic image of the environment of the aircraft on the basis of information emanating from said information sources; and
- display means able to present, on at least one part of a display screen, said synthetic image, is noteworthy in that said information processing means are formed in such a way as to implement the process specified under claim 1.

Thus, said device according to the invention provides a representation which shows the terrain, the position of the aircraft and of its future trajectory, as well as possible alerts of risks of collision with the terrain and of crossing of safety altitudes, in the form of a three-dimensional image. This three-dimensional image is directly and intuitively accessible to the pilots, without particular effort.

The device in accordance with the invention, which therefore makes it possible to aid pilots to instantaneously ascertain the position of the aircraft in its environment, at the present instant and in the minutes to come, consequently affords a valuable aid to the awareness of the situation of the aircraft in relation to the terrain and considerably increases flight comfort and safety.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
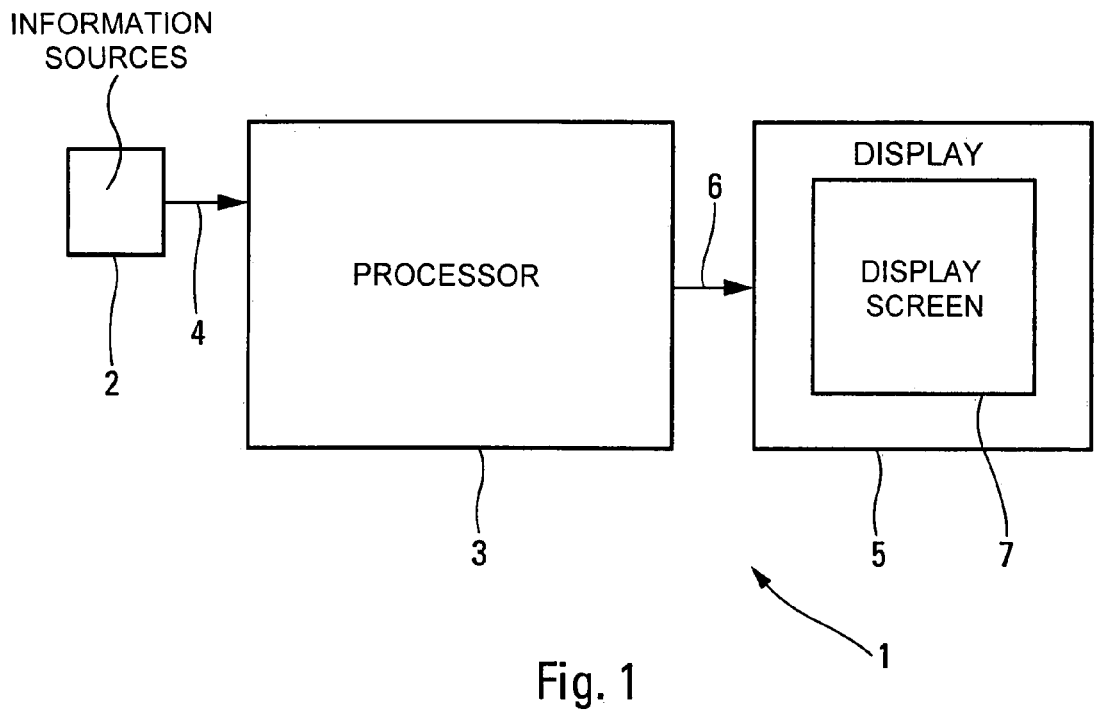
FIG. 1 is the schematic diagram of a device in accordance with the invention.

The device 1 in accordance with the invention and represented diagrammatically in FIG. 1 is intended for the construction of a synthetic image IM of the environment of an aircraft A, in particular of a civil transport airplane, and for its presentation to at least one pilot of said aircraft A.

To do this, said device 1 which is carried on board the aircraft A is of the type comprising:
- information sources 2 comprising, for example, sensors, computers, onboard systems, etc., which provide information relating to the aircraft A and to its environment;
- information processing means 3 connected by a link 4 to said information sources 2 and able to construct a synthetic image IM of the environment of the aircraft A on the basis of information emanating from said information sources 2; and
- display means 5 connected by a link 6 to said information processing means 3 and able to present, on at least one part of a display screen 7, said synthetic image IM.

Figure 2:
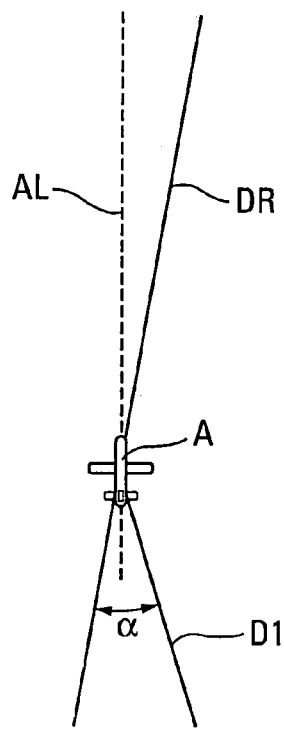
FIGS. 2 to 8 and 11 illustrate various depictions enabling the implementation of the process in accordance with the invention to be properly portrayed.
Figure 3:
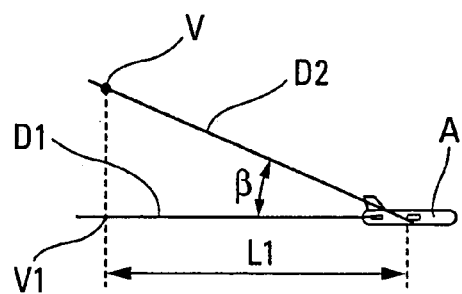

According to the invention, said information processing means 3 implement a process comprising the string of following steps consisting in:
- a/ determining a straight line D2 passing through the location of the aircraft A and forming an angle of lateral separation a and an angle of vertical separation β with the course DR of the aircraft A (FIGS. 2 and 3). The expression location of the aircraft A is understood to mean its spatial position and more precisely the spatial position of its center of gravity.

To do this, in a first variant, a straight line D1, situated in a horizontal plane, forming an angle of lateral separation α with the instantaneous course DR of the aircraft A and cutting this course at the current location of the aircraft A is determined, as represented in FIG. 2. Next, said straight line D2, which is situated in the same vertical plane as the straight line D1, which forms an angle of vertical separation β with the straight line D1 and which cuts said straight line D1 and also said course DR at the current location of the aircraft A is determined, as represented in FIG. 3. It will be noted that the instantaneous course DR forms a generally non-zero angle with the longitudinal axis AL of the aircraft A in FIGS. 2, 4 and 5.

Figure 4:
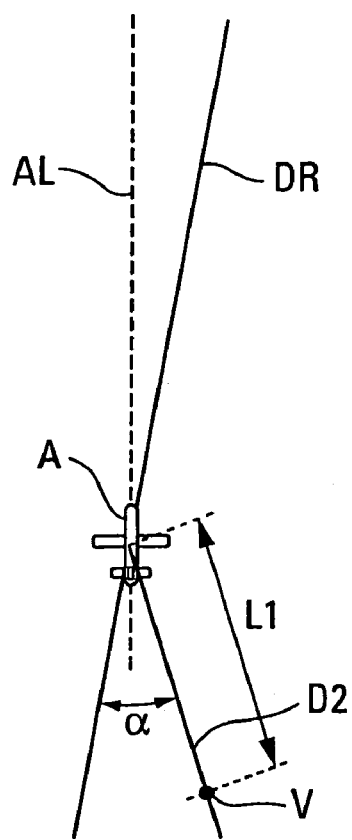
Figure 5:
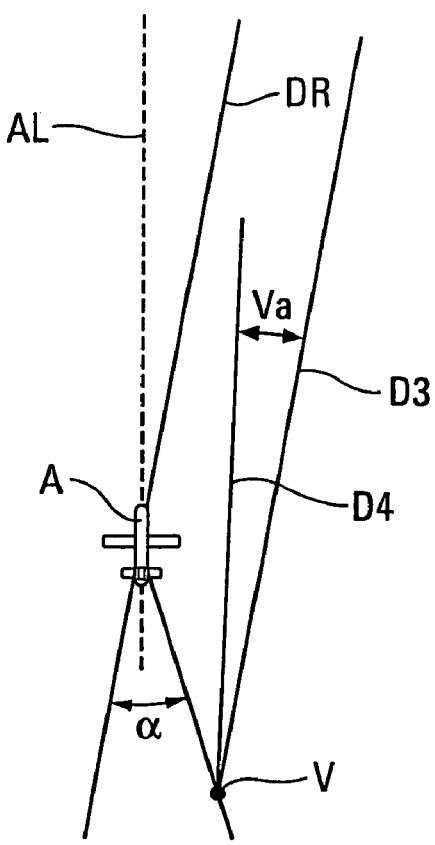
Figure 6:
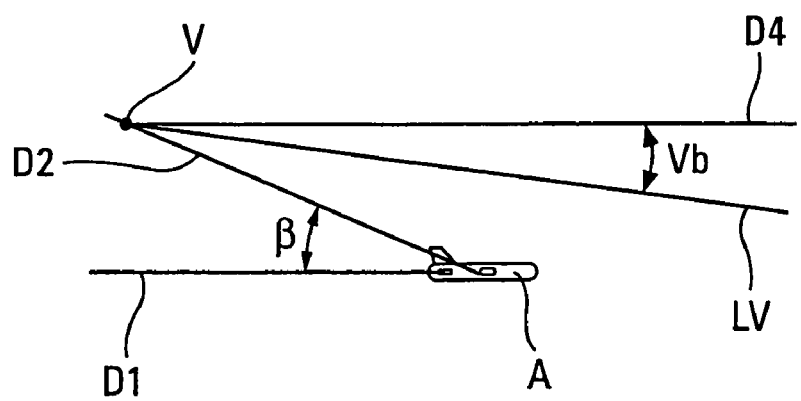
Figure 7:
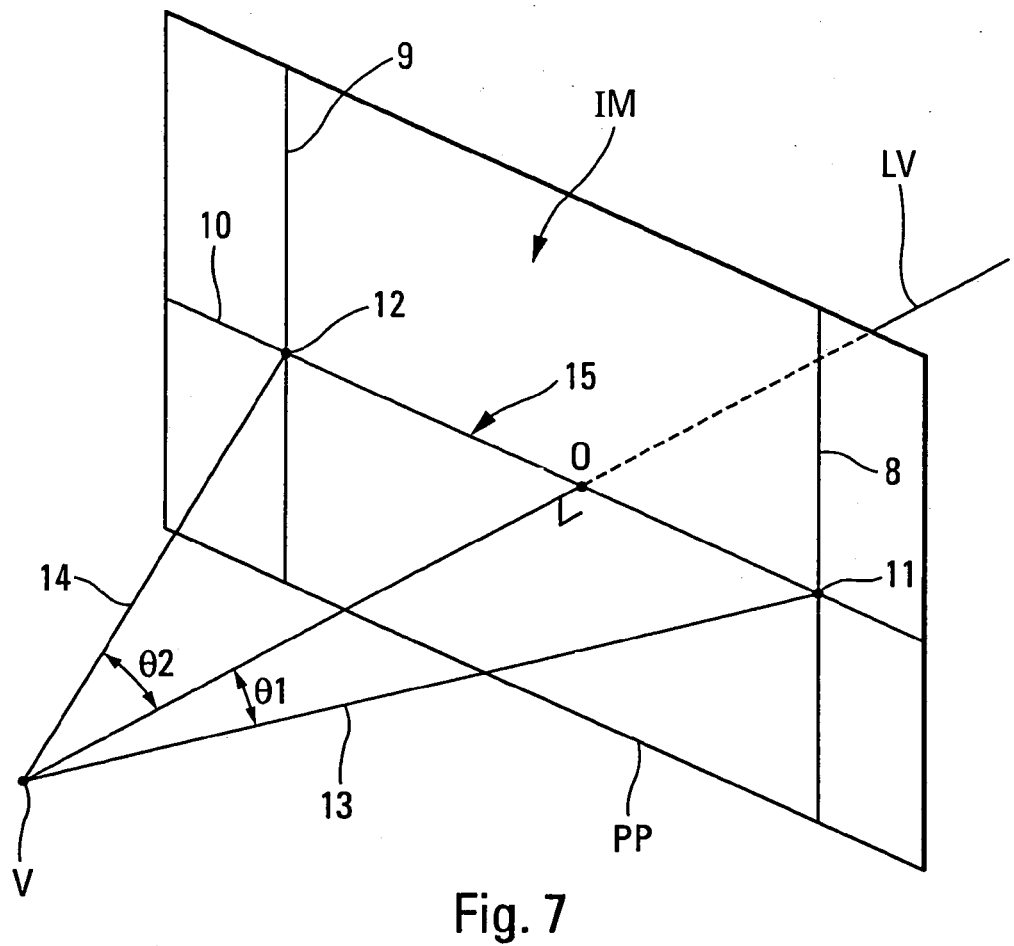

In a second variant (not represented), a straight line D1A (not represented) forming an angle of vertical separation β with the instantaneous course DR of the aircraft A is firstly determined, then said straight line D2 which exhibits an angle of lateral separation α with this straight line D1A is formed;

b/ determining a point V which is situated on said straight line D2 to the rear of the aircraft A at a distance such that the vertical projection V1 of this point V onto the horizontal plane passing through the location of the aircraft A, is situated at a predetermined distance L1 from said location of the aircraft A, as represented in FIGS. 3 and 4;

c/ determining a line of aim LV (FIG. 6) passing through said point V and forming an angle of lateral separation va and an angle of vertical separation vb with a straight line D3 passing through said point V and parallel to said course DR of the aircraft A. To do this, in a first variant, a straight line D4 which passes through the point V, which is situated in a horizontal plane, and which forms an angle of lateral separation va with the straight line D3 is determined, as represented in FIG. 5. Next, the line of aim LV, which is situated in the same vertical plane as the straight line D4, and which forms an angle of vertical separation vb with the straight line D4 and which cuts the straight line D4 at the point V is determined, as represented in FIG. 6. In a second variant (not represented), a straight line D4A (not represented) forming an angle of vertical separation vb with the straight line D3 is firstly determined, then the straight line LV which forms an angle of lateral separation va with the straight line D4A is determined;

d/ defining a plane of projection PP which is orthogonal to said line of aim LV and which is situated at an arbitrary distance L2 from said point V. Said line of aim LV cuts the plane of projection PP at a point O (FIG. 7);

e/ constructing an image IM of at least a part of the environment at least in front of the aircraft A, with the aid of a conical projection onto said plane of projection PP while taking account of said point V as reference point of the projection, as will be seen in greater detail hereinbelow;

f/ laterally delimiting said image IM by two vertical straight lines 8 and 9 cutting, as represented in FIG. 7, respectively the horizon line 10 of the image IM at points 11 and 12 which are such that, on the one hand, the angle θ1 between the line of aim LV and a straight line 13 passing through said points V, 11 corresponds to a predetermined angle and, on the other hand, the angle θ2 between the line of aim LV and a straight line 14 passing through said points V, 12 corresponds to a predetermined angle;

g/ adapting the scale of the image IM thus delimited so as to match the straight line segment 15 which is formed by said points 11, 12 and which defines the width of the image IM, to the width of the display screen 7 on which one wishes to present this image IM, and this image IM is delimited vertically as a function of the height of said display screen 7. Preferably, the vertical limitation of the image IM is such that the horizon line 10 of this image IM is situated substantially in the upper third of the display screen 7; and h/ transmitting the image IM thus constructed which represents a synthetic image to said display means 5 so that they present it on said display screen 7.

Thus, said information processing means 3 make it possible to construct a synthetic image IM in three dimensions so as to display the position (or the location) of the aircraft A, together with the environment in which this aircraft A is deploying. This synthetic image IM is constructed according to a viewpoint.(point V) outside the aircraft A. The display (or the presentation) of this image IM on the display screen 7, which is for example situated in the piloting station of the aircraft A, makes it possible to improve the awareness that the pilot has of the actual situation of the aircraft A. This display screen 7 may be a specific screen or an existing screen already on the aircraft A, such as a standard navigation screen of "ND" ("Navigation Display") type.

In a preferred embodiment of the invention:

the value of the angle α (step a) lies in an interval substantially equal to [6°; 15°]. Preferably, the angle α is substantially equal to 9° or 10°;

the value of the angle β (step a) lies in an interval substantially equal to [3°; 10°]. Preferably, the angle β is substantially equal to 5° or 6°;

the value of the distance L1 (step b) lies in an interval substantially equal to [2 Nm; 10 Nm] (around [3.7 km; 18.5 km]), Nm being a nautical, mile, the international unit of distance measurement employed in aeronautics and equal to 1852 meters. Preferably, the distance L1 is substantially equal to 5 Nm (around 9.3 kilometers);

the value of the angle va (step c) preferably lies in an interval substantially equal to [0; α]. When va=0, the line of aim LV is situated in a vertical plane parallel to the course DR of the aircraft A. When va=α, the line of aim LV is such that the representation of the aircraft A is situated at the center of the image IM; and the value of the angle vb (step c) preferably lies in an interval substantially equal to [0; β].

It will be noted that the construction of the image IM has been represented in FIGS. 2, 4 and 5 in the case where the point V is situated slightly to the right at the rear of the aircraft A. Without departing from the scope of the present invention, an image may naturally also be constructed from a point V which is situated slightly to the left at the rear of the aircraft A.

Additionally, the projection used in step e) is a standard conical projection. It is known that such a conical projection (or central projection) is by construction the representation closest to our visual perceptions. It makes it possible in particular to see a sphere as a circle. A conical projection of three-dimensional space is a projective transformation which sends all the points of this space onto one and the same plane of projection PP of this space. It requires that a reference point V (equivalent to the position of the eye of an observer) and a plane of projection PP (Dürer's glass, the equivalent of the retina) [FIGS. 7 and 8] be given. The image µ of a point M under this conical projection is defined as the intersection of the straight line VM (equivalent to the light ray coming from the point M reaching the eye V) with the plane of projection PP. Unlike affine projections, the conical projection does not preserve the barycentet (hence the ratios of lengths on a given straight line). It only preserves the alignment and the cross ratio. It will be noted moreover that the point O (point of intersection of the straight line LV with the plane of projection PP) belongs to a straight line corresponding to the representation of the horizon line 10 in the plane of-projection PP. This line corresponds to the projection of points situated at infinity. According to this conical projection, two parallel straight lines in space are represented as converging to one and the same point which is situated at infinity, and which is therefore represented on this horizon line 10.

Figure 8:
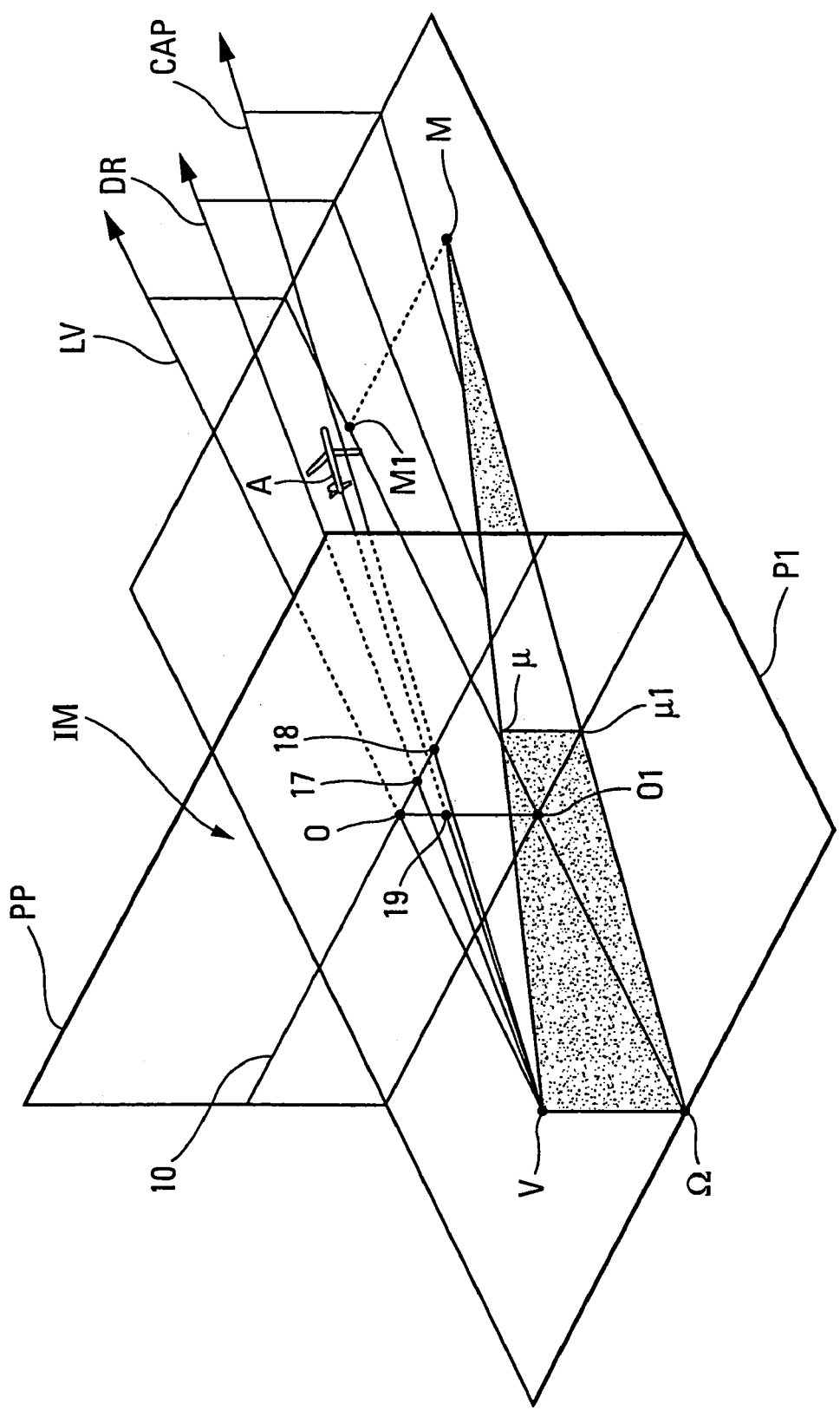

The representation of FIG. 8 allows a proper portrayal of said conical projection. In this FIG. 8 are represented:
- the plane of projection PP which is orthogonal to the line of aim LV passing through the point V and cutting this plane of projection PP at the point O;
- a plan P1 which is orthogonal to said plane of projection PP;
- the course DR and the heading CAP of the aircraft A, which cut the plane of projection PP respectively at points 17 and 18 which therefore illustrate the course DR and the heading CAP on the image IM;
- a point 19 illustrating the position of the aircraft A and corresponding to the point of the plane of projection PP that cuts the straight line passing thorough the point V and the aircraft A;
- a point Ω corresponding to the projection of the point V onto the plane P1; and
- points M1 and M which are situated on said plane P1, the straight lines ΩM1, ΩM and VM cutting the plane of projection PP at points 01, µ1 and µ respectively.

The conical projection makes it possible to obtain the following equations in particular:

$$\begin{cases} \dfrac{01\mu 1}{M1M} = \dfrac{\Omega 01}{\Omega M1} \\ \dfrac{\mu \mu 1}{V\Omega} = \dfrac{M\mu 1}{M\Omega} = \dfrac{M101}{M1\Omega} \end{cases}$$

In a particular embodiment of the invention, the pilot of the aircraft A has available a function that he can activate (for example by pressing a key (not represented)) to cause a rotation of the line of aim LV by a predetermined angle about the aircraft A, by increasing the value of the angle α by the value of this predetermined angle, so as to be aware of the situation of the aircraft A with respect to the terrain which is situated behind the aircraft A (angle of 180°) or to the sides (angles of ±90°). Such a function is particularly advantageous in the phases of approach to an airport or of turning of the aircraft A. In a variant of this particular embodiment, the line of aim LV is rotated by a predetermined angle about the point V, without modifying the angle α. Thus, for a value of said predetermined angle equal to 180°, it is possible to display an image of the terrain situated behind the aircraft A, said image not representing the aircraft.

Additionally, it is known that, on a navigation screen of "ND" type ("Navigation Display") of an aircraft A, in the so-called "ARC" or "ROSE" modes, the display comprises a so-called "heading scale" graduation which corresponds to all or part of a graduation from 0 to 360° centered on this aircraft A, the value 0 of this graduation corresponding to North. For each angular value of the heading scale, it is possible to define a straight line passing through the center of gravity of the aircraft A and forming an angle corresponding to this angular value, with respect to the 0° direction of this heading scale. The representation of this straight line in the plane of projection converges (at infinity) to a point situated on the horizon line. It is thus possible to define a heading scale associated with the virtual image constructed in the plane of projection: this heading scale consists of a set of points on the horizon line, this amounting to graduating the horizon line in angular values of the heading scale. For reasons of homogeneity of display between such a "ND" screen and the virtual image IM which is the subject of the present invention, in a preferred embodiment, when a "ND" screen is used as display screen 7, the lateral limitation of the virtual image IM (previous step f) is carried out in such a way that the straight lines 13 and 14 cut the horizon line 10 at points 11 and 12 which correspond, on a heading scale of this virtual image IM, to the limit values of the heading scale displayed on the "ND" screen. For example, in numerous cases, these limit values are equal to ±45° on either side of the current heading of the aircraft A, i.e. an angular discrepancy of 90° on the heading scale between said points 11 and 12.

More generally, according to the invention, the values of the angles θ1 and θ2 are chosen in such a way that the angular discrepancy on the heading scale between said points 11 and 12 lies in an interval substantially equal to [40°; 140°]. Preferably, this angular discrepancy is chosen substantially equal to 90°. In a preferred embodiment, the values θ1 and θ2 are chosen substantially equal (the point O is then substantially at the center of the image IM).

Figure 9:
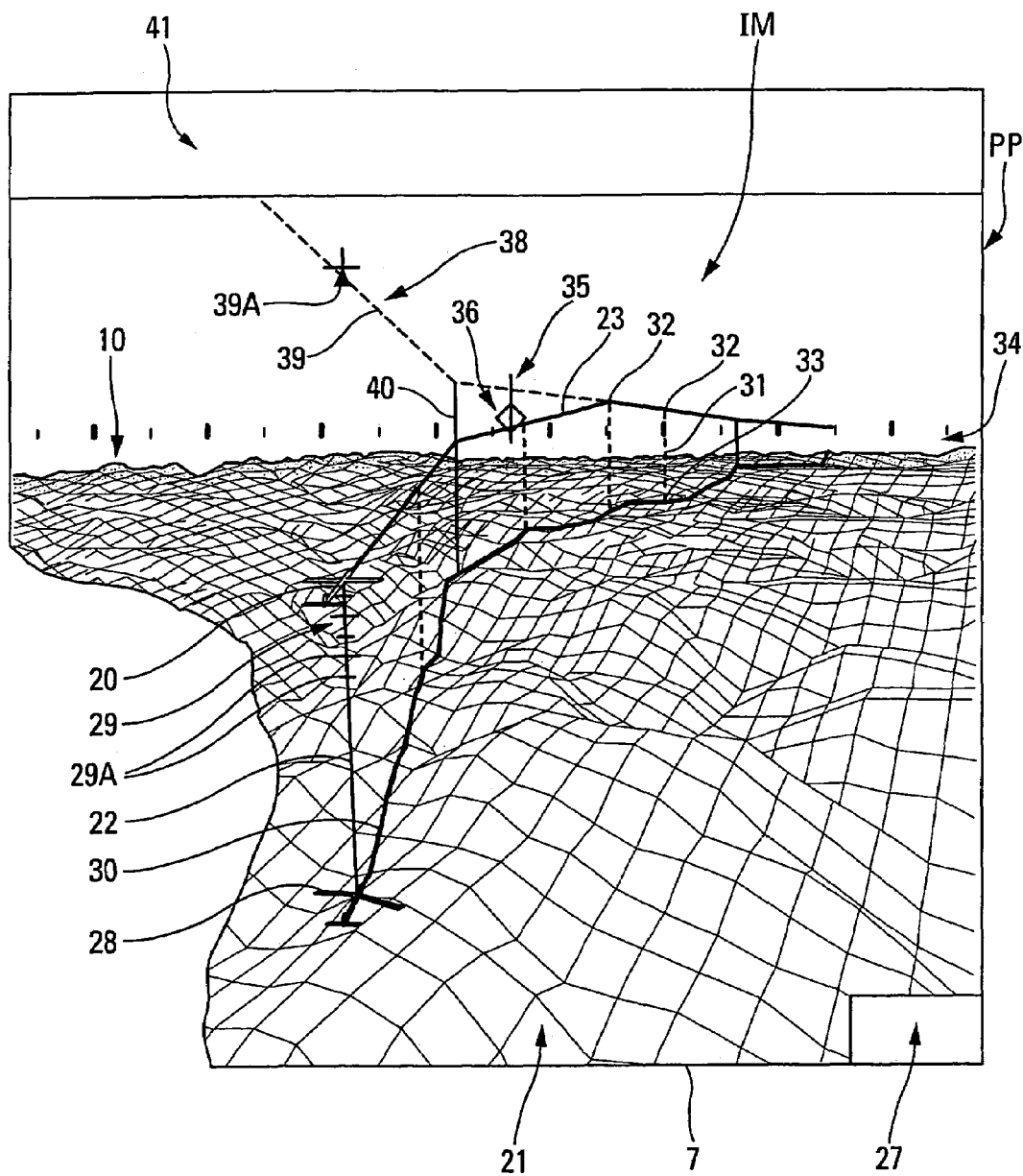
FIGS. 9 and 10 are two partially cutaway views which show two images constructed in accordance with the present invention, which are presented on a display screen and which relate respectively to two different situations.
Figure 10:
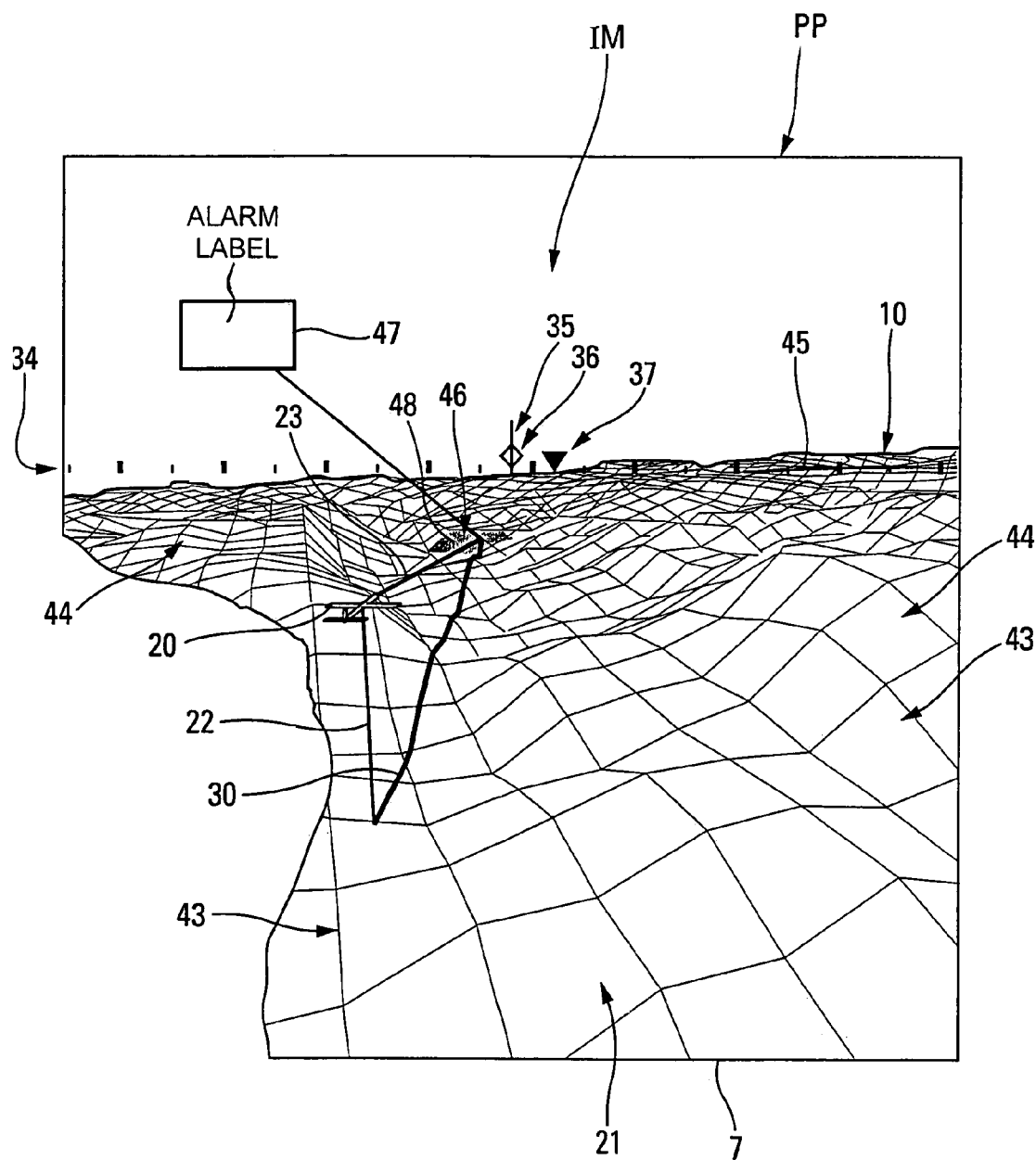

In a preferred embodiment of the invention, the image IM constructed in the aforesaid step e) comprises at least the following elements, as is represented in FIGS. 9 and 10:
- a symbol 20 representing the aircraft A, situated at the point 19 of FIG. 8 and indicating its location;
- a representation 21 illustrating the terrain;
- a vertical reference stroke 22, preferably solid, between said symbol 20 of the aircraft A and its vertical projection onto said terrain 21; and
- a plot 23, preferably solid, representing the future trajectory of the aircraft A.

The display screen 7 represented in FIGS. 9 and 10 is partially cut away to facilitate the writing of the references.

The symbol 20 is fixed in the image IM in 3D and gives the pilots a permanent and immediate reference when glancing at the display screen 7. The terrain 21 shifts, it moves under the symbol 20, thus scrolling the relief around the mock-up of the aircraft A. In order to foster straightforward comprehension of the image IM, the symbol 20 is representative of the actual attitudes of the aircraft A in roll, pitch and yaw. This information is qualitatively reported on this symbol 20 which tilts according to the three axes.

Figure 11:
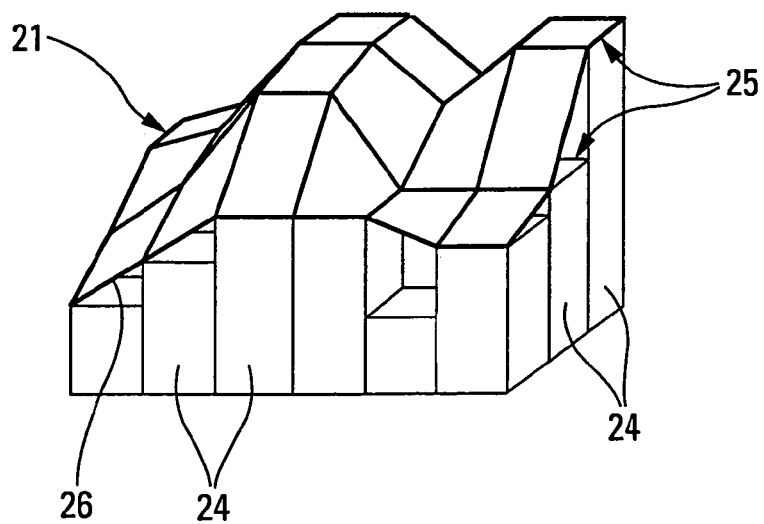

Additionally, the construction of the representation 21 illustrating the terrain is effected on the basis of an onboard database forming part of said information sources 2, and constructed for example on the "WGS84" (GPS compatible) terrestrial benchmark. In a preferred embodiment, this representation 21 is constructed around elementary cubes 24 of variable dimensions representing a portion of terrain, as illustrated in FIG. 11, the upper ends 25 of said elementary cubes 24 being connected together by a surface 26 which forms said representation 21.

The accuracies required of this representation 21 depend on the zones overflown. Around airports, during critical phases of flight (initial climb and final approach in particular), the resolution must be refined so as to obtain an optimal terrain mesh consisting, for example, of squares (end surfaces 25) of 15"×15". During cruising flight, wider squares of 3'×3' are sufficient. A constant resolution is also possible so as to display a fine accuracy, extended over the entire relief and with no difference. These values are defined consistently with the resolutions of existing databases, which are carried on board the aircraft A. To comply with the safety objectives of the device 1, the digital relief constructed must encompass the entire actual relief with a specified level of confidence; the elementary cubes 24 must therefore completely cover the terrain to be displayed.

Thus, the representation 21 illustrating the terrain is a realistic and intuitive representation, which fosters immediate awareness of the actual geography. This terrain-smoothing operation ensures optimal safety and allows faithful modeling of the outside relief.

In a preferred embodiment, the image IM constructed in the aforesaid step e) also comprises a grid associated with the representation 21 of the terrain. This grid corresponds to the vertical projection of the edges of the upper ends 25 of the elementary cubes 24 onto the surface 26 forming said representation 21. Such a mode of representation allows proper qualitative comprehension of the concept of distance. It also allows better visual perception of the perspective effect.

Naturally, it is also possible, as a variant, to represent only said elementary cubes 24 without carrying out any smoothing.

It will be noted that said representation 21 illustrating the terrain can include obstacles created by man (towers, bridges, etc). These obstacles may be integrated into the aforesaid onboard database or into a specific database.

In a preferred embodiment, the terrain altitude taken into account in the representation 21 is multiplied by a coefficient k whose value lies in an interval substantially equal to [1.5; 2.5]. Preferably, the coefficient k is substantially equal to 2. The application of such a multiplier coefficient makes it possible to amplify the altitudes and therefore to improve the perception of reliefs.

In a preferred embodiment, the points situated in front of the aircraft A at a distance greater than a predetermined distance L3 are not represented on the virtual image IM constructed in the plane of projection PP. They may be replaced in this image by a uniform coloration for the entire set of said points. This uniform coloration may for example be gray or white, so as to be perceived visually as mist. Preferably, the value L3 is chosen equal to the maximum distance used on a plan view, represented on a "ND" type navigation screen, that is to say the zone situated in front of the aircraft A and which is displayed on this "ND" screen, L3 being limited moreover to a value of 150 kilometers (around 80 Nm) beyond which the perspective no longer allows details to be distinguished. To facilitate the understanding of the perspective, it may be useful, on the one hand, to display on the screen 7, for example in a rectangle 27 represented in FIG. 9, the value of the maximum distance chosen and to modify the size of the symbol 20 which becomes larger and larger as said maximum distance decreases.

Additionally, said vertical stroke 22 represented between the symbol 20 of the aircraft A and its vertical projection onto the terrain 21 comprises a scale 29 consisting of horizontal marks 29A placed on this vertical stroke 22 so as to indicate predetermined distances under the aircraft A. For example, these marks 29A are spaced apart by a distance corresponding to a value of 500 feet (around 150 meters) and the number of marks 29A is limited to five, so as not to overload the display.

In a particular embodiment, said vertical reference stroke 22 also comprises a safety altitude indication, not represented.

Additionally, a symbol 28 is represented at the intersection of said vertical stroke 22 and of the terrain 21 so as to allow visualisation of the vertical projection of the aircraft A on the terrain 21. This symbol 28 may for example be gray and resemble a "shadow" of the aircraft A. The pilot thus clearly marks a lateral deviation, in particular in case of simultaneous projection of the flight plan.

It will be noted moreover that the representation of the plot 23 of the future trajectory is necessary so as to allow the crew to anticipate dangerous situations. The presentation of this trajectory helps to improve the situational awareness of the pilot. Future trajectory is the name given to the prediction of the trajectory actually followed by the aircraft A. Naturally, the determination of the future trajectory 23 depends on the mode of piloting used on the aircraft A.

In manual mode, the trajectory 23 represented is a straight line corresponding to the instantaneous trajectory of the aircraft A. The length represented of this future trajectory 23 corresponds to a flight duration over a short period (since it is not possible to predict the future actions of the pilot) lying for example between 30 seconds and 3 minutes. In the particular case where the aircraft A performs a continuous turn, the future trajectory. 23 can correspond to an extrapolation of this continuous turn for a predetermined duration.

In selected mode (that is to say when the automatic pilot of the aircraft A is controlled by the pilot, through a selection of heading, of altitude and/or of speed), the length represented of this future trajectory 23, calculated as a function of the parameters provided to the automatic pilot, corresponds to a flight duration over a medium-term period, lying for example between 3 minutes and 10 minutes.

In managed mode (that is to say when the automatic pilot is controlled by a flight management computer of "FMS" type: "Flight Management System"), the length represented of this future trajectory 23 corresponds to a flight duration over a medium-term period of for example between 3 minutes and 10 minutes. In this case, the trajectory represented is therefore that calculated by said "FMS" computer.

In will be noted that a mixture of the managed and selected modes is possible, depending on whether the lateral guidance or the vertical guidance of the aircraft A is considered. For-example, a selected mode is possible for vertical guidance and a managed mode for lateral guidance.

Additionally, it should be noted that the representations of the future trajectory and of its vertical projection onto the terrain may be effected in such a way as to be representative of the mode of piloting (manual, selected, managed or mixture of selected and managed), in particular depending on the color, the thickness or the type (continuous or dashed) of stroke used. For example, it is conceivable to use a continuous yellow stroke for the future trajectory in manual mode, a continuous blue stroke for its vertical projection onto the terrain, a continuous green stroke for the future trajectory in selected mode, a dashed green stroke for the future trajectory in managed mode, etc.

Additionally, the image IM constructed in the aforesaid step e) furthermore comprises, as represented in FIG. 9:
plot 30 representing the vertical projection onto said terrain 21 of the future trajectory 23 of the aircraft A;

a plurality of vertical strokes 31 between points 32 situated on said plot 23 representing the future trajectory of the aircraft A and the corresponding vertical projections 33 of these points 32 onto said terrain 21. Preferably, said points 32 correspond to the scheduled position of the aircraft A at various intervals of time or of distance, for example each minute during the next 5 minutes. Furthermore, at least one of said vertical strokes 31 comprises a safety altitude indication.

In an embodiment not represented, a safety altitude is represented, on a vertical stroke 31 in the form of a specific coloration, for example magenta, of that part of said stroke which is situated under this safety altitude. In the case where the altitude of the aircraft A (respectively of a point 32 situated on the future trajectory 23) is less than this safety altitude, this vertical stroke 31 is extended upward to an altitude corresponding to this safety altitude. The symbol 20 of the aircraft A (respectively a point 32 of the future trajectory 23) then lies under the upper part of the representation of the safety altitude. This constitutes a simple and immediate visual mark of a potentially dangerous situation. This information may also be represented in digital form.

Additionally, the image IM also comprises a heading scale 34 represented above the horizon line 10.

As well as the heading scale 34 proper, supplementary symbols may be disposed on the image IM, on or in immediate proximity to said heading scale 34. A first symbol 35, consisting for example of a vertical yellow mark, can indicate the current heading (projection of the longitudinal axis AL of the aircraft A onto the heading scale 34). A second symbol 36, consisting for example of a green diamond and situated at the point 17 of FIG. 8, can indicate the current course DR of the aircraft A. A third symbol 37, consisting for example of a cyan colored triangle, can indicate the heading or the course chosen by the pilot (in the selected mode).

Additionally, the image IM constructed in step e) furthermore comprises a flight plan 38. The flight plan 38 is displayed on the entire image IM, at the pilot's request. The flight plan 38 corresponds to the ideal trajectory programmed for example by the pilot into the flight management computer. Said flight plan 38 is artificially split into various subparts. In a preferred embodiment, the flight plan 38 comprises:

- a trajectory 39 in space, represented for example by dashes and accompanied by a symbol 39A to specify the position of the aircraft A with respect to this trajectory 39 in space;
- a ground projection (not represented) of this trajectory 39; and
- vertical references (waypoints along the course, displayed in the form of vertical strokes 40 surmounted, for example, by a green or white diamond).

Additionally, the image IM constructed in step e) furthermore comprises complementary information which is for example displayed on a strip 41 envisaged on the display screen 7 above the 3D representation. This complementary information may in particular correspond to the report of information customarily displayed on a "ND" screen, such as the wind (direction and force), the speed of the aircraft, the next waypoint, etc.

In a preferred embodiment represented in FIG. 10, the terrain 21 is colored as a function of the altitude margin (or discrepancy) between the current altitude of the aircraft A and the altitude of said terrain 21.

Thus, the terrain 21 is represented with a neutral color 43, when the value of its altitude is less than a first predetermined value A1 in relation to the current altitude of the aircraft A. It is represented with a first alarm color 44 when the value of its altitude lies between said first value A1 and a second predetermined value A2, in relation to the altitude of the aircraft A, and it is represented with a second alarm color 45 when the value of its altitude is greater than said second value A2. By way of nonlimiting example, the following preferred values may be indicated: A1 is equal to −500 feet [i.e. 500 feet (or around 150 meters) below the current altitude of the aircraft A] and A2 is equal to +2000 feet [i.e. 2000 feet (around 600 meters) above the current altitude of the aircraft A]. Furthermore, by way of illustration, said neutral color 43 corresponds to green, said first alarm color 44 corresponds to yellow and said second alarm color 45 corresponds to red.

Advantageously, when the aircraft. A performs a rapid descent [for example with a negative vertical speed of absolute value greater than 1000 feet per minute (around 300 meters per minute)], in order to better anticipate the altitude of this aircraft A when it overflys the relief, its current altitude mentioned in the process indicated hereinabove is replaced with a calculated altitude corresponding to the scheduled altitude of the aircraft A (depending on its descent conditions) after a predetermined duration with respect to the current instant, for example substantially equal to 30 seconds.

Advantageously, the distance between the future trajectory 23 and the terrain 21 is calculated and analysed so as to detect a risk of collision of the aircraft A with said terrain 21, by taking into account a safety margin. If a zone of potential conflict exists, an alarm is signaled. For example, said zone of potential conflict 46 is colored in an alerting manner (color 48). The display of this zone may also flash and its frequency of flashing may be all the higher the closer the zone of conflict is to the aircraft A.

In a preferred embodiment of the invention, the colors 43, 44, 45 and 48 chosen for the representation of the terrain 21 are homogeneous with those used by a standard terrain avoidance system on board the aircraft A.

Preferably, a (virtual) protection envelope is set in place around the aircraft A and its future trajectory 23. This protection envelope makes it possible to detect any intrusion or approach of the terrain with a certain margin around the position of the aircraft A and of its future trajectory 23. This margin consists of a preset fixed margin and of a margin taking account of the uncertainty of the instruments, of the automatic facilities and of the terrain related database. The aircraft A is thus guaranteed to be in the envelope in the minutes to come, and to be so with a certain probability. The vertical and lateral dimensions of the envelope agreeing with the safety objectives of the function follow from this probability and from the choice of preset safety margins. The protection envelope may, also be refined as a function of the flight phase, so as to avoid untimely alarms and as a function of the accuracies of positioning of the aircraft A. Any zone entering this envelope is colored in an alerting manner and flashing may be associated with it.

Additionally, when a threatening zone 46 is detected, an alarm label 47, presenting the time before impact, is displayed, as is represented in FIG. 10 (even when this conflict zone is situated outside the region visible on the screen 7). This countdown information therefore supplements the coloration of the threatening terrain.

Preferably, the detection of a risk of collision with the terrain is disabled in the phase of final approach with a view to landing so as not to give rise to untimely alarms.

In a particular embodiment of the invention, as well as the detection of a risk of collision of the future trajectory 23 with the terrain, one also carries out the detection of a risk of intersection of the trajectory 39 corresponding to the flight plan 38 of the aircraft A, with said terrain.

The device 1 in accordance with the invention, which makes it possible to aid pilots to instantaneously ascertain the position of the aircraft A in its environment, at the present instant and in the minutes to come, therefore affords a valuable aid to the awareness of the situation of the aircraft in relation to the terrain and considerably increases flight comfort and safety. Specifically, said device 1 makes it possible to present the pilots with intuitive and instinctive information requiring no mental effort in order to be processed. The information support used offers a synthetic and immediate picture. The 3D. representation produced improves the pilot's overall situational awareness as regards:
- the outside environment;
- the future trajectory 23 of the aircraft A with respect to the environment (terrain 21) and to the scheduled flight plan 38; and
- possibly neighboring traffic and/or meteorological phenomena.

The invention claimed is:

1. A process for constructing a synthetic image of the environment of an aircraft and presenting it to at least one pilot of said aircraft, comprising:
   a) passing a first straight line through a location of the aircraft and forming a first angle of lateral separation $\alpha$ and a first angle of vertical separation $\beta$ with the course of the aircraft is determined;
   b) determining a first point, said point being situated on said first straight line to the rear of the aircraft at a distance such that a vertical projection of this first point onto a horizontal plane passing through the location of the aircraft, is situated at a predetermined distance L1 from said location of the aircraft;
   c) determining a line of aim passing through said first point and forming a second angle of lateral separation va and a second angle of vertical separation vb with a second straight line passing through said first point and parallel to said course of the aircraft;
   d) defining a plane of projection which is orthogonal to said line of aim;
   e) constructing an image of at least a part of the environment at least in front of the aircraft, with the aid of a conical projection onto said plane of projection while taking account of said first point as reference point of the projection;
   f) delimiting said image laterally by two vertical straight lines respectively cutting a horizon line of the image at second and third points which are such that, on the one hand, the angle between the line of aim and a third straight line passing through said first and second points corresponds to a predetermined angle and, on the other hand, the angle between the line of aim and a fourth straight line passing through said first and third points corresponds to a predetermined angle;
   g) adapting the scale of the image thus delimited so as to match the straight line segment which is formed by said second and third points and which defines the width of the image, to the width of a display screen for presenting said image, and delimiting this image vertically as a function of the height of said display screen; and
   h) presenting the image thus constructed representing a synthetic image on said display screen.

2. The process as claimed in claim 1, wherein said first angle of lateral separation $\alpha$ lies between 6° and 15°.

3. The process as claimed in claim 1, wherein said first angle of vertical separation $\beta$ lies between 3° and 10°.

4. The process as claimed in claim 1, wherein said predetermined distance L1 lies between 3 and 20 kilometers.

5. The process as claimed in claim 1, wherein said second angle of lateral separation va is less than or equal to said first angle of lateral separation $\alpha$.

6. The process as claimed in claim 1, wherein said second angle of vertical separation vb is less than or equal to said first angle of vertical separation $\beta$.

7. The process as claimed in claim 1, wherein said display screen is furnished with a heading scale and said angles between, on the one hand, the line of aim and, on the other hand, said third and fourth straight lines are such that the angular discrepancy on the heading scale between said second and third points lies between 40° and 140°.

8. The process as claimed in claim 1, wherein in step g), the image is delimited vertically in such a way that the horizon line of said image is situated in the upper third of said display screen.

9. The process as claimed in claim 1, wherein in step e), only an image of the environment which is situated up to a predetermined distance in front of the aircraft is constructed.

10. The process as claimed in claim 1, wherein the image constructed in step e) comprises at least the following elements:
    - a first symbol representing the aircraft and indicating its location;
    - a representation illustrating the terrain;
    - a vertical reference stroke between said symbol of the aircraft and its vertical projection on said terrain; and
    - a first plot representing the future trajectory of the aircraft.

11. The process as claimed in claim 10, wherein said first symbol representing the aircraft is representative of the attitudes of the aircraft in roll, pitch and yaw.

12. The process as claimed in claim 10, wherein the image constructed in step e) furthermore comprises a second plot representing the vertical projection onto said terrain of the future trajectory of the aircraft.

13. The process as claimed in claim 10, wherein the image constructed in step e) furthermore comprises a plurality of vertical strokes between points situated on said first plot representing the future trajectory of the aircraft and the corresponding vertical projections of these points onto said terrain.

14. The process as claimed in claim 13, wherein at least one of said vertical strokes comprises a safety altitude indication.

15. The process as claimed in claim 10, wherein the image constructed in step e) furthermore comprises a second symbol situated at the intersection of said vertical reference stroke and said representation illustrating the terrain.

16. The process as claimed in claim 10, wherein said vertical reference stroke comprises a scale.

17. The process as claimed in claim 10, wherein said vertical reference stroke comprises a safety altitude indication.

18. The process as claimed in claim 10, wherein the image constructed in step e) furthermore comprises a heading scale represented above the horizon line.

19. The process as claimed in claim 10, wherein the image constructed in step e) furthermore comprises a flight plan.

20. The process as claimed in claim 10, wherein the image constructed in step e) furthermore comprises supplementary information.

21. The process as claimed in claim 10, wherein said representation illustrating the terrain is colored as a function of the discrepancy between the altitude of the aircraft and the altitude of said terrain.

22. The process as claimed in claim 10, wherein the image constructed in step e) furthermore comprises a grid which is associated with the representation of the terrain and which corresponds to the vertical projection of the edges of the upper ends of elementary cubes onto a surface forming said representation.

23. The process as claimed in claim 10, wherein any risk of collision of the aircraft with the terrain is detected by calculating the distance between the future trajectory of the aircraft and said terrain, and a first alarm indication is presented on said image when such a risk of collision is detected.

24. The process as claimed in claim 10, wherein any risk of intersection of a flight plan of the aircraft with the terrain is detected by calculating the distance between a trajectory corresponding to this flight plan of the aircraft and said terrain, and a second alarm indication is presented on said image when such a risk of intersection is detected.

25. The process as claimed in claim 10, wherein a rotation of the line of aim by a predetermined angle about the aircraft is carried out.

26. A device for constructing a synthetic image of the environment of an aircraft and presenting it to at least one pilot of said aircraft, said device comprising:
- information sources comprising information relating to the aircraft and to its environment;
- information processing section able to construct a synthetic image of the environment of the aircraft on the basis of information emanating from said information sources; and
- display means able to present, on at least one part of a display screen, said synthetic image, wherein:
- said information processing section formed in such a way as to implement the process specified under claim 1.

* * * * *